US006568584B2

(12) United States Patent
Wittebrood et al.

(10) Patent No.: US 6,568,584 B2
(45) Date of Patent: *May 27, 2003

(54) NICKEL-PLATED BRAZING SHEET PRODUCT

(75) Inventors: Adrianus Jacobus Wittebrood, Velserbroek (NL); Jacques Hubert Olga Joseph Wijenberg, Amsterdam (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/912,413

(22) Filed: Jul. 26, 2001

(65) Prior Publication Data

US 2002/0050511 A1 May 2, 2002

(30) Foreign Application Priority Data

Jul. 26, 2000 (EP) .............................. 00202662

(51) Int. Cl.$^7$ ........................... B23K 35/38; B23K 35/12
(52) U.S. Cl. ....................... 228/219; 228/247; 228/183; 228/262.51; 428/650; 428/654
(58) Field of Search ................. 228/247, 219, 228/183, 262.51, 221; 205/183, 255, 257; 428/650, 654

(56) References Cited

U.S. PATENT DOCUMENTS

| | | | |
|---|---|---|---|
| 2,821,014 A | | 1/1958 | Miller |
| 3,963,454 A | | 6/1976 | Singleton, Jr. |
| 3,970,237 A | | 7/1976 | Dockus |
| 3,979,042 A | * | 9/1976 | Peters ....................... 228/183 |

(List continued on next page.)

FOREIGN PATENT DOCUMENTS

| | | |
|---|---|---|
| EP | 227261 | 10/1986 |
| FR | 2354171 | 1/1978 |
| FR | 2617868 | 1/1989 |

OTHER PUBLICATIONS

Adrianus Jacobus Wittebrood, Jacques Hubert Olga Joseph Wijenberg, Joop Nicolaas Mooij, "Nickel–plated Aluminium Brazing Sheet", Research Disclosure, No. 439, pp. 1946–1947 (Nov. 2000).

Aluminum Soft–Soldering, 2301 N.T.I.S. Tech Notes (Manufacturing) (1985) Jan., No. 1G. Springfield, VA, USA, pp. 12–13.

B.E. Cheadle and K.F. Dockus "Inert Atmosphere Fluxless Brazing of Aluminum Heat Exchangers", SAE–paper No. 880446, International Congress and Exposition, Detroit, MI Feb. 29–Mar. 4, 1998.

Wernick and Pinner "The Surface Treatment and Finishing of Aluminum and its Alloys", $5^{th}$ Edition, vol. 2, pp. 1023–1071(1998).

Primary Examiner—Tom Dunn
Assistant Examiner—L. Edmondson
(74) Attorney, Agent, or Firm—Stevens, Davis, Miller & Mosher, LLP

(57) ABSTRACT

The invention relates to a brazing sheet product comprising a core sheet made of an aluminum alloy, an aluminum clad layer cladding at least one of the surfaces of said core sheet, and a layer comprising nickel on the outersurface of one or both said clad layer or layers, and wherein the brazing sheet product is devoid of a layer comprising zinc or tin as a bonding layer between said outersurface of said aluminum clad layer or layers and said layer comprising nickel, and wherein the aluminum clad alloy layer comprises, in weight percent: Si 2 to 18, Mg up to 8.0, Zn up to 5.0, Cu up to 5.0, Mn up to 0.30, In up to 0.30, Fe up to 0.80, Sr up to 0.20, at least one element selected from the group consisting of: (Bi 0.01 to 1.0, Pb 0.01 to 1.0, Li 0.01 to 1.0, Sb 0.01 to 1.0), impurities each up to 0.05, total up to 0.20, balance aluminum.

26 Claims, 1 Drawing Sheet

U.S. PATENT DOCUMENTS

| | | | |
|---|---|---|---|
| 4,028,200 A | | 6/1977 | Dockus |
| 4,388,159 A | | 6/1983 | Dockus et al. |
| 4,602,731 A | | 7/1986 | Dockus |
| 4,721,653 A | | 1/1988 | Oda et al. |
| 4,854,495 A | * | 8/1989 | Yamamoto et al. ...... 220/2.3 R |
| 5,069,980 A | * | 12/1991 | Namba et al. .............. 165/180 |
| 5,422,191 A | | 6/1995 | Childree |
| 5,705,885 A | * | 1/1998 | Yamada et al. ............. 313/537 |
| 5,744,255 A | * | 4/1998 | Doko et al. ................. 428/654 |
| 5,971,258 A | * | 10/1999 | Eichhorn et al. ........... 148/528 |
| 6,379,818 B1 | * | 4/2002 | Mooij et al. ................ 205/177 |
| 6,383,661 B2 | * | 5/2002 | Wittebrood et al. ........ 205/255 |
| 6,391,476 B2 | * | 5/2002 | Wittebrood et al. ........ 205/183 |
| 6,503,640 B2 | * | 1/2003 | Wittebrood et al. ........ 428/654 |
| 2001/0007720 A1 | * | 7/2001 | Soga et al. ................. 428/654 |
| 2001/0040180 A1 | * | 11/2001 | Wittebrood et al. ........ 228/219 |
| 2002/0088717 A1 | * | 7/2002 | Wittebrood et al. ........ 205/259 |

* cited by examiner

US 6,568,584 B2

NICKEL-PLATED BRAZING SHEET PRODUCT

FIELD OF THE INVENTION

The invention relates to a brazing sheet product in which a layer comprising nickel is plated onto a surface of a clad layer made of an Al—Si alloy containing Si in the range of 2 to 18 weight %, and wherein the brazing sheet product is devoid of a layer comprising zinc or tin as a bonding layer between said outersurface of said aluminum clad layer or layers and said layer comprising nickel. The invention also relates to a brazed assembly comprising at least one component made of the brazing sheet product and to a method of manufacturing an assembly of brazed components.

DESCRIPTION OF THE RELATED ART

For the purpose of this invention brazing sheet is to be understood as a core sheet, for example of aluminum or aluminum alloy, having on at least one side a brazeable aluminum alloy or filler material. Typical brazeable aluminum alloys useful as such a clad layer are the Aluminum Association (AA)4xxx-series alloys, typically having Si in the range of 2 to 18 weight %. The brazeable aluminum alloys may be coupled to the core alloy in various ways known in the art, for example by means of roll bonding, cladding, or semi-continuous or continuous casting, and thermal spraying.

Controlled Atmosphere Brazing ("CAB") and Vacuum Brazing ("VB") are the two main processes used for industrial scale aluminum brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the oxide layer is mainly being caused by the evaporation of magnesium from the clad alloy. There is always more magnesium present in the clad alloy then necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. CAB is essentially a continuous process in which, if the proper brazing flux is being used, high volumes of brazed assemblies can be manufactured. The brazing flux dissolves the oxide layer at brazing temperature allowing the clad alloy to flow properly. When the Nocolok flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminum surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the brazing flux application. Such a material can be supplied to a manufacturer of brazed assemblies and is ready to use directly after shaping of the assembly parts. No additional brazing fluxing operations have to be carried out. Presently, only one process for flux-less brazing is used on an industrial scale. The material for this process can be for example standard brazing sheet made from an AA3xxx-series core alloy being clad on both sides with a cladding of an AA4xxx-series alloy. Before the brazing sheet can be used the surface has to be modified in such a way that the naturally occurring oxide layer does not interfere during the brazing cycle. The method of achieving good brazing is to deposit a specific amount of nickel on the surface of the clad alloy. If properly applied, the nickel reacts, presumably exothermically, with the underlying aluminum. The nickel can be applied by using a shim of nickel between two parts to be joined or can be deposited by electroplating. When electroplating is used the adherence of the nickel should be sufficient to withstand typical shaping operations being used in for example heat exchanger manufacture.

The processes for nickel-plating of aluminum brazing sheet are known from each of U.S. Pat. No. 3,970,237, U.S. Pat. No. 4,028,200, U.S. Pat. No. 4,388,159, U.S. Pat. No. 4,602,731, and SAE-paper no. 880446 by B. E. Cheadle and K. F. Dockus. According to these documents, nickel is deposited in combination with lead. Alternatively, cobalt is deposited in combination with lead. It is known in the art that instead of nickel, cobalt or combinations thereof, also iron may be used. The lead addition is used to improve the wettability of the clad alloy during the brazing cycle. An important characteristic of these plating processes is that the nickel or cobalt is preferentially deposited on the silicon particles of the aluminum clad alloy. To obtain sufficient nickel or cobalt for brazing on the surface, the aluminum clad alloy should contain a relatively large number of silicon particles to act as nuclei for the nickel deposition. It is believed that to obtain sufficient nucleation sites before plating a part of the aluminum in which the silicon particles are embedded should be removed by chemical and/or mechanical pre-treatment. This is believed a necessary condition to obtain a sufficient nickel and/or cobalt coverage to serve as nuclei for the wetting action of the filler alloy or aluminum clad alloy.

However, the use of lead for the production of a suitable nickel or cobalt layer on brazing sheet has several disadvantages. The plating baths for electroplating are rather complex and due to the presence of lead comprising components such as salts thereof, these are much more environmentally unfriendly than plating baths having nickel or cobalt comprising components alone. The use of lead for manufacturing products, such as automotive products, is undesirable and it is envisaged that in the very near future there might possibly even be a ban on lead comprising products or products manufactured via one or more processing steps comprising lead or lead components.

Some other disclosures of Ni-plating found in the prior art literature will be mentioned below.

General textbook by Wernick and Pinner, "The Surface Treatment and Finishing of Aluminum and its Alloys", 5th edition, Volume 2, pp.1023–1071. This textbook describes in general immersion processes for plating on aluminum.

FR-A-2,617,868 describes a method of manufacturing aluminum product with a brazeable surface coating of tin or a tin-bismuth alloy, wherein the product is provided with an intermediate layer. This intermediate layer is composed of a first layer of zinc and a second layer of nickel, which nickel has been deposited by electrolysis from a neutral electrolyte. Here, the underlying aluminum or aluminum alloy is not melted in the subsequent brazing process.

SUMMARY OF THE INVENTION

It is an object of the invention to provide a brazing sheet product having a core sheet and filler material, to be melted during brazing, said filler material comprising an aluminum clad layer of an Al—Si alloy and a nickel layer on the aluminum clad layer, in which there is no further need for the addition of lead to the layer comprising nickel while maintaining good brazeability of the brazing sheet product into an assembly.

It is an object of the invention to provide a nickel-plated brazing sheet product which can be used in a vacuum brazing process as well as in an controlled atmosphere brazing process in the absence of a brazing-flux, but ideally suitable for CAB process in the absence of a brazing-flux.

It is another object of the invention to provide a method of manufacturing an assembly of brazed components using the brazing sheet product of this invention.

In accordance with the invention in one aspect there is brazing sheet product comprising a core sheet (1) made of an aluminum alloy, an aluminum clad layer (2) cladding at least one of the surfaces of said core sheet, and a layer (3) comprising nickel on the outersurface of one or both said clad layer or layers (2), and wherein the brazing sheet product is devoid of a layer comprising zinc or tin as a bonding layer between said outersurface of said aluminum clad layer or layers (2) and said layer comprising nickel (3), characterized in that the aluminum clad alloy layer comprises, in weight percent: Si 2 to 18, Mg up to 8.0, Zn up to 5.0, Cu up to 5.0, Mn up to 0.30, In up to 0.30, Fe up to 0.80, Sr up to 0.20, at least one element selected from the group consisting of: (Bi 0.01 to 1.0, Pb 0.01 to 1.0, Li 0.01 to 1.0, Sb 0.01 to 1.0) (preferably the magnesium level in the clad layer does not exceed 2.0%, i.e., Mg is 0.2 to 2.0, when it is present essentially only to promote the wetting action of the brazing alloy), other elements/impurities each up to 0.05, total up to 0.20, balance aluminum.

The invention is based on the insight that the aluminum clad layer may comprise one or more elements selected from the group consisting of bismuth, lead, lithium and antimony, each in a range of 0.01 to 1.0%, and the combination of two or more elements does preferably not exceed 1.0%, and that magnesium may be present in a range of 0.2 to 2.0%. The combination of magnesium with one or more other elements from this group does preferably not exceed 2.5%. Hence, magnesium may be present in the aluminum clad layer up to 8.0%, preferred ranges have been set out below, to enhance amongst others the mechanical properties of the aluminum clad layer, whereas it has also been found that magnesium in a range of 0.2 to 2.0% may also act in a similar way as elements selected from the group bismuth, lead, lithium and antimony. Preferably the magnesium level in the clad layer does not exceed 2.0% when it is present essentially only to promote the wetting action of the brazing alloy in combination with the preferably lead-free nickel layer. Further alloying elements may be added to improve specific properties of the aluminum alloy clad layer. In U.S. Pat. No. 3,970,237 it is mentioned that the clad layer is preferably electroplated with a layer of nickel, nickel-lead, cobalt, cobalt-lead or combinations thereof. The brazing sheet product obtained is suitable for flux-less brazing under controlled atmosphere conditions. The addition of lead is believed to improve the wettability during brazing. However, in accordance with the invention it has been found surprisingly that the nickel and/or cobalt layer itself, and which is preferably applied by electroplating, does not need to comprise the lead as a mandatory alloying addition. Surprisingly it has been found that an equal or even better results can be obtained if one or more elements of the group Bi, Pb, Li and Sb and Mg is being added in the given ranges to the aluminum clad layer itself. Adding one or more of these alloying elements to the clad layer has the advantage that the composition of the plating bath becomes less complex, which is a major achievement in itself, whereas the alloying element addition to the cladding is very simple when manufacturing the clad layer. Also the use of environmentally unfriendly lead components, such as lead-based salts, has been overcome. As a result the nickel layer applied may essentially consist of nickel and unavoidable impurities. From an operational point of view bismuth is the most preferred alloying element to the aluminum clad layer. Furthermore, it has been found that the element bismuth is the most preferred alloying element to promote wetting, and consequently less of this element is required to achieve a similar effect as with lead addition in the nickel and/or cobalt layer. Although, lead as alloying element in the clad layer in the given range results in the desired effect, the addition of this element is preferably avoided since it forms from an environmentally point of view an undesirable element.

Some prior art literature which describe one or more of the elements from this group, however in a different context, are:

U.S. Pat. No. 5,422,191 discloses a brazing sheet composite comprising a lithium-containing filler alloy cladding on the aluminum-silicon core material. The lithium is within the range of 0.01 to 0.30%, and the magnesium is not exceeding 0.05%. The brazing sheet composite can be used by either a vacuum brazing process or a controlled atmosphere brazing process. In the event the filler alloy is employed in the CAB process, a brazing-flux is being used, for example the well-known NOCOLOK (trade name). Furthermore, the use of a layer comprising nickel has not been mentioned.

U.S. Pat. No. 5,069,980 discloses a clad aluminum alloy for vacuum brazing. The cladding material is to be used on both sides of a core sheet. It contains 6–14% silicon, 0–0.6% magnesium, balance aluminum and additionally, at least one of the following elements may also be incorporated in the cladding alloy for the improvement of its corrosion resistance: Pb, Sn, Ni, Cu, Zn, Be, Li and Ge. The role of these additives in the clad alloy are equated as far as their corrosion-resistance improving effect is concerned.

U.S. Pat. No. 4,721,653 discloses a brazing sheet product having a core sheet on one or both of its surfaces a brazing alloy consisting essentially of 11–13 wt. % silicon, 1.0–2.0 wt. % Mg, and the balance aluminum. This magnesium containing clad layer is used in a vacuum brazing process only, and the use of a layer comprising nickel has not been mentioned.

French application no. FR-2354171 discloses an aluminum brazing sheet product having a clad layer comprising, in weight percent, 7–14% silicon, 0.02–2% magnesium, 0.05–0.3% lead, max. 0.6% iron, max. 0.3% Mn, balance aluminum and impurities. This magnesium containing clad layer is used in a vacuum brazing process only, and the use of a layer comprising nickel has not been mentioned.

European application no. EP-0227261 discloses a core alloy for application in a brazing sheet product. The brazing sheet product is to be used in a vacuum brazing process. The aluminum core alloy contains vanadium in the range of 0.02 to 0.4% by weight for improving the corrosion-resistance of the alloy.

The layer comprising nickel is preferably an electroplated layer. Preferably in the brazing sheet product the layer comprising nickel has a thickness up to 2.0 μm, preferably up to 1.0 μm, and more preferably up to 0.5 μm. A coating thickness of greater than 2.0 μm requires a prolonged treatment time for plating, and may result in wrinkling of the molten filler material during brazing. A preferred minimum thickness for this Ni-containing layer is 0.3 μm. In an embodiment, bismuth and lead in the nickel-containing layer, each independently have an upper limit of 0.01%. More preferably, however the layer comprising nickel is essentially free from lead, and even more preferably also essentially free from bismuth. By "essentially free" it is meant that none of the element, or compounds containing the element, are deliberately added to the plating bath. However, other techniques such as roll bonding, electroless plating, thermal spraying, Chemical Vapor Deposition and Physical Vapor Deposition or other techniques for depositing of metals or metal alloys from a gas or vapor phase may be used.

In an embodiment of the brazing sheet product each aluminum clad layer has a thickness ranging from about 2 to 20% of the total thickness of the total brazing sheet product thickness.

In a preferred embodiment of the brazing sheet product according to the invention the bismuth addition in the aluminum clad layer has an upper limit of 0.5%. A suitable lower limit for the bismuth addition is 0.01% and more preferably 0.05%.

In an embodiment of the brazing sheet product according to the invention the lithium addition in the aluminum clad layer has an upper limit of 0.5%. A suitable range for the lithium addition is 0.01–0.3%.

In an embodiment of the brazing sheet product according to the invention the antimony addition in the aluminum clad layer has an upper limit of 0.5%. A suitable range for the antimony addition is 0.01–0.3%.

In an embodiment the aluminum clad layer comprises, in weight percent, Si in the range of 2 to 18%, and preferably 7 to 18%, as alloying element and further magnesium in the range of up to 8.0%, and preferably up to 5.0%. Preferably the magnesium is in the range of 0.2 to 5.0%, and more preferably 0.5 to 2.5%. Further alloying elements may be added in suitable ranges. It has been found that in use of the brazing sheet product in a brazing cycle the presence of magnesium in the aluminum clad layer has no detrimental effects during brazing. This is a major improvement over known Ni-plated brazing sheet products. It allows for the design of clad layers which may contribute to the strength of the total brazing sheet product or alternatively the brazing sheet products having thinner clad layers. Furthermore, it allows that Mg-containing brazing sheet may be applied in both Vacuum Brazing and flux-less Controlled Atmosphere Brazing. The latter possibility has many economical and technical advantages. In addition it has been found that due to the addition of both bismuth and magnesium as alloying elements overcomes the need for the addition of wetting or bonding promoting alloying elements to the sequentially applied nickel layer. The brazing sheet product according to the invention may readily be used in the existing industrial brazing lines.

In another embodiment the aluminum clad layer comprises, in weight percent, Si in the range of 2 to 18%, and preferably 7 to 18%, as alloying element and further zinc in the range of up to 5.0%. Preferably the zinc is in the range of 0.5 to 3%. Further alloying elements may be added such as, but not limited to, Mg, In and Cu in suitable ranges. In accordance with the invention it has been found that when this brazing sheet product is used the presence of zinc in the cladding has no detrimental effects during brazing. This is considered a major improvement over known brazing sheet products. It allows for the design of a cladding which may contribute to the strength of the total brazing sheet product. Furthermore, the brazing sheet product wherein the cladding contains zinc as a deliberate alloying element may be applied in both Vacuum Brazing and flux-less Controlled Atmosphere Brazing, both processes being used on an industrial scale.

In another embodiment the aluminum clad layer comprises, in weight percent, Si in the range of 2 to 18%, and preferably 7 to 18%, as alloying element and further copper in the range of up to 5.0%. Preferably the copper is in the range of 3.2 to 4.5%. Further alloying elements may be added such as, but not limited to, Mg, In and Zn in suitable ranges. In accordance with the invention it has been found that when this brazing sheet product is used in a brazing cycle the presence of copper in the cladding has no detrimental effects during brazing. This is a major improvement over known brazing sheet products. It allows for the design of an aluminum cladding layer which may contribute to the strength of the total brazing sheet product. Further, the brazing sheet product wherein the aluminum cladding contains copper as a deliberate alloying element may be applied in both Vacuum Brazing and flux-less Controlled Atmosphere Brazing, both processing being used on an industrial scale.

In all embodiments of the aluminum clad layer indium in a range of up to 0.30% may be present as an alloying element to reach a more electronegative corrosion potential of the clad alloy as compared to the aluminum core alloy. Indium has been found to be much more effective in reducing the corrosion potential of the alloy as compared to zinc additions. Typically 0.1% In is as effective as 2.5% Zn.

In all embodiments of the aluminum clad layer manganese may be present in the aluminum clad layer as an impurity element in a range of up to 0.30%, and is preferably present only up to 0.10% and more preferably up to 0.05%.

In all embodiments of the aluminum clad layer iron may be present in the clad layer as a typical impurity element in aluminum alloys in a range of up to 0.8%, and preferably in a range of up to 0.4%.

In all embodiments of the aluminum clad layer strontium in a range of up to 0.20% may be added to modify the silicon present in the aluminum clad layer during the solidification when casting the aluminum clad alloy and during brazing. A more preferred maximum for the strontium addition is up to 0.05%.

In an embodiment of the brazing sheet product according to the invention, the core sheet is an aluminum alloy comprising magnesium in a range of up to 8.0%. In a preferred embodiment magnesium is in a range of 0.5 to 5.0%. Further alloying elements may be added in suitable ranges. It has been found that when the brazing sheet product of the invention is used, the presence of magnesium in the clad layer has no detrimental effects during brazing. This is considered a major improvement over the known Ni-plated brazing sheets. The diffusion of Mg from the core to the cladding during the manufacturing of the brazing sheet product itself and its application in a subsequent brazing process, appears to have no detrimental effects on the brazeability of the brazing sheet product in accordance with the invention. This allows for the design of high strength brazing sheet products having an aluminum core sheet having magnesium in the given range as an important strengthening element. The brazing sheet product may be applied in both Vacuum Brazing and flux-less Controlled Atmosphere Brazing, both processes being used extensively on an industrial scale.

In the brazing sheet product according to the invention the core sheet may be coupled to the aluminum clad layer via one or more intermediate layer or layers. The benefits of having such an intermediate layer or interlayer have been described in for example U.S. Pat. No. 2,821,014, the contents of which are incorporated here by reference.

The invention further provides a brazed assembly comprising at least one component made of the brazing sheet product produced in accordance with the invention described above.

In a further aspect of the invention there is provided in a method of manufacturing a brazed assembly using one or more brazing sheet products in accordance with the invention, comprising the sequential process steps of:

(a) shaping parts of which at least one is made from the brazing sheet product of the invention as set out above;
(b) assembling the parts into an assembly;
(c) brazing the assembly under a vacuum or in an inert atmosphere in the absence of a brazing-flux at elevated temperature for a period long enough for melting and spreading of the filler alloy, whereby the filler alloy is formed by at least the aluminum clad alloy (2) according to the invention and the Ni layer (3);
(d) cooling the brazed assembly. The cooling rate may be in the range of typical brazing furnace cooling rates. Typical cooling rates are cooling rates of at least 10° C./min or more, typically 40° C./min or more.

In dependence on the aluminum alloy of the core sheet the process may further include the further processing step (e) of aging of the brazed and cooled assembly in order to optimize the mechanical and/or corrosion properties of the resultant assembly.

The use of the brazing sheet product in accordance with the invention has been found to result in a lower brazing temperature by about 10° C. This reduced brazing temperature allows for a significant reduction of the industrial scale processing time for a whole brazing cycle, typically a time reduction of 20% or more has been found.

In a further aspect of the invention there is provided in a method of use of the aluminum clad alloy, set out above and set forth elsewhere in the present specification, in a brazing sheet product.

In a further aspect of the invention there is provided in a method of use of the aluminum clad alloy, set out above and set forth elsewhere in the present specification, in a brazing sheet product in a method of manufacturing a brazed assembly in an inert atmosphere brazing (CAB) process in the absence of a brazing-flux.

BRIEF DESCRIPTION OF THE DRAWINGS

The invention will now be illustrated by several non-limitative examples, and with reference to the drawings, wherein.

DESCRIPTION OF PREFERRED EMBODIMENTS

Figure 1:
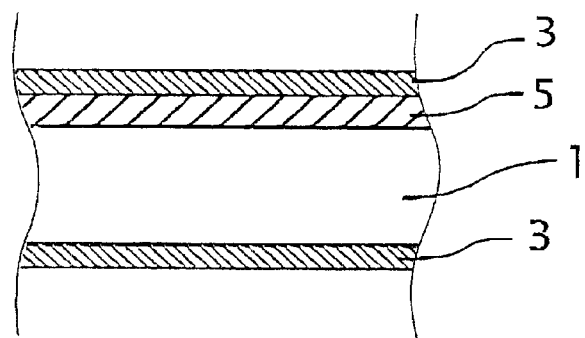
FIG. 1 is a schematic longitudinal section showing the structure of the brazing sheet product according to the state of the art.

FIG. 1 shows schematically brazing sheet in accordance with the prior art as would be obtained by the process in accordance with for example U.S. Pat. No. 3,970,237. The brazing sheet product consists of a core sheet 1 on one or both sides clad with an aluminum clad layer 5 comprising an Al—Si-alloy. On top of the clad layer 5 a thin nickel-lead layer 3 is applied by means of electroplating.

Figure 2:
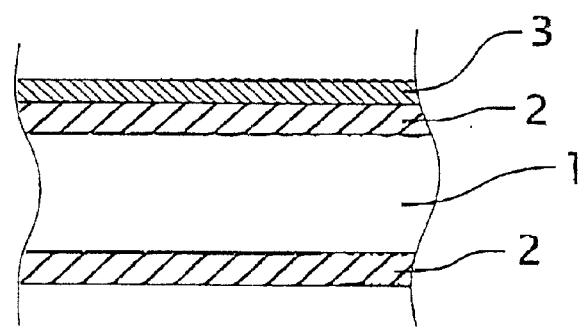
FIG. 2 is a schematic longitudinal section showing the structure of the brazing sheet product according to the invention.

FIG. 2 shows schematically brazing sheet in accordance with the present invention comprising a core sheet 1, the clad layer 2 comprising an Al—Si—Bi alloy and the Ni-layer 3, the advantages of which are set out above. In FIG. 2 the layer 3 has been shown on only one side of the brazing sheet, but it will be immediately apparent to the skilled person that they may also be applied on both sides of the brazing sheet product. The composition of the various layers and their advantages have been set out above.

Figure 3:
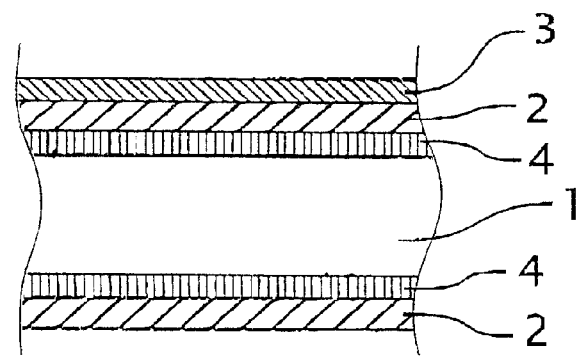
FIG. 3 is a schematic longitudinal section showing the structure of the brazing sheet product according to the invention.

FIG. 3 shows schematically a further brazing sheet in accordance with the present invention which has the layers of FIG. 2 and a further intermediate layer 4 between the core sheet 1 and the aluminum clad layer 2 on both sides. In FIG. 3 the layer 3 has been shown on only one side of the brazing sheet product, but it will be immediately apparent to the skilled person that they may also be applied on both sides of the brazing sheet product. In addition the intermediate layer 4 may also be applied on one side of the brazing sheet product. The possible compositions of the various layers and their advantages have been set out above.

EXAMPLE

On a laboratory scale of testing aluminum brazing sheet products manufactured from an Aluminum Association (AA)3003 core alloy clad on one side by means of roll-bonding with AA4000-series aluminum clad alloys of four different compositions (see Table 1), and having a total thickness of 0.5 mm, and a clad layer thickness of about 50 $\mu$m, were treated as set out in Table 2.

The treatment consisted of the following sequential process steps:

cleaning by immersion for 180 sec. in ChemTec 30014 (a commercial available degreaser and alkaline etch cleaner), followed by rinsing;

alkaline etching for 20 sec. in ChemTec 30203 (a commercial available alkaline etch cleaner) at ambient temperature, followed by rinsing;

optionally desmutting for 4 sec. in an acidic oxidizing bath, typically 25–50 vol % nitric acid, comprising ChemTec 11093 (a commercial available pickle activator) at ambient temperature, followed by rinsing;

nickel electroplating, and rinsing.

For the nickel electroplating a basic bath without any lead or bismuth has been used, indicated as "L-" in Table 2. The lead- and bismuth-free basic bath comprised 50 g/l nickel sulphate, 50 g/l nickel chloride, 30 g/l sodium citrate, and 75 ml/l ammonium hydroxide (30%). The plating conditions at 26° C. were such that a plating time of 50 sec. resulted in a nickel plated layer of 0.5 $\mu$m thickness using a current density of 3 A/dm$^2$.

The brazeability has been assessed as follows. On a laboratory scale of testing the brazing tests were carried out in a small quartz furnace. Small coupons of 25 mm×25 mm were cut from the nickel-plated sheets. A small strip of an AA3003 alloy measuring 30 mm×7 mm×1 mm was bent in the center to an angle of 45° and laid on the coupons. The strip on the coupon samples were heated under flowing nitrogen, with heating in about 10 minutes from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)=good brazeability, and (+)=excellent brazeability. The results obtained are summarized in Table 2.

The results of clad layer no. 2 demonstrate that adding Bi to the cladding results in an excellent brazeability. Consequently, the addition of lead and/or bismuth directly to the nickel layer can be omitted in accordance with the invention. The results of clad layer no. 3 demonstrate that adding Bi to the aluminum cladding in combination with magnesium still results in an excellent brazeability. The results of clad layer no. 4 demonstrate that adding Bi to the aluminum cladding in combination with zinc still results in an excellent brazeability. Whereas if there is neither bismuth nor lead present in the clad layer nor lead present in the nickel layer results in a poor brazeability (see clad alloy no.1).

TABLE 1

Composition of the clad alloy, in weight %, balance Al and inevitable impurities.

| Alloy | Si | Fe | Cu | Mn | Mg | Zn | Ti | Bi |
|---|---|---|---|---|---|---|---|---|
| 1 | 10.0 | 0.3 | <0.01 | <0.02 | <0.02 | <0.02 | 0.003 | — |
| 2 | 9.9 | 0.2 | <0.01 | <0.02 | <0.02 | <0.02 | 0.003 | 0.09 |
| 3 | 9.6 | 0.25 | <0.01 | <0.02 | 1.35 | <0.02 | 0.003 | 0.13 |
| 4 | 7.6 | 0.35 | <0.01 | <0.02 | <0.02 | 1.02 | 0.003 | 0.11 |

TABLE 2

Pretreatment applied and testing results.

| Clad alloy no. | Clean. | Etching | Desmut. | Ni-plating | Brazeability |
|---|---|---|---|---|---|
| 1 | yes | yes | yes | L− | − |
| 1 | yes | yes | no | L− | − |
| 2/3/4 | yes | yes | yes | L− | + |

Having now fully described the invention, it will be apparent to one of ordinary skill in the art that many changes and modifications can be made without departing from the spirit or scope of the invention as herein described.

What is claimed is:

1. A brazing sheet product comprising:

a core sheet (1) made of an aluminum alloy;

an aluminum alloy clad layer (2) cladding on at least one of the surfaces of said core sheet; and a layer (3) comprising nickel on the outersurface of one or both said clad layer or layers (2);

wherein the brazing sheet product is devoid of a layer comprising zinc or tin as a bonding layer between said outersurface of said aluminum alloy clad layer or layers (2) and said layer comprising nickel (3), and the aluminum clad alloy layer comprises, in weight percent:

| Si | 2 to 18 |
|---|---|
| Mg | up to 8.0 |
| Zn | up to 5.0 |
| Cu | up to 5.0 |
| Mn | up to 0.30 |
| In | up to 0.30 |
| Fe | up to 0.80 |
| Sr | up to 0.20 | at least one element selected from the group consisting of:

| Bi | 0.01 to 1.0 |
|---|---|
| Pb | 0.01 to 1.0 |
| Li | 0.01 to 1.0, and |
| Sb | 0.01 to 1.0; and | impurities each up to 0.05, total up to 0.20 balance aluminum, wherein said layer (3) comprising nickel has a thickness of not more than 2.0 μm.

2. The brazing sheet product according to claim 1, wherein said layer (3) comprising nickel is essentially free from lead.

3. The brazing sheet product according to claim 1, wherein said layer (3) comprising nickel is essentially free from bismuth.

4. The brazing sheet product according to claim 1, wherein said layer (3) comprising nickel has a thickness of not more than 2.0 μm.

5. The brazing sheet product according to claim 1, wherein said layer (3) comprising nickel has a thickness of not more than 1.0 μm.

6. The brazing sheet product according to claim 1, wherein said layer (3) comprising nickel has a thickness of not more than 0.5 μm.

7. The brazing sheet product according to claim 1, wherein said aluminum alloy clad layer (2) contains by weight Mg in an amount in the range of 0.2 to 5.0%.

8. The brazing sheet product according to claim 1, wherein said aluminum clad layer (2) contains by weight Mg in an amount in the range of 0.2 to 2.0%.

9. The brazing sheet product according to claim 1, wherein said aluminum clad layer (2) contains by weight Zn in an amount in the range of 0.5 to 3.0%.

10. The brazing sheet product according to claim 1, wherein said aluminum clad layer (2) contains by weight Bi in an amount in the range of 0.01 to 0.5%.

11. The brazing sheet product according to claim 1, wherein the total of Bi, Pb, Li and Sb contained by said aluminum clad layer (2) is by weight an amount in the range of equal to or less than 1.0%.

12. A brazing sheet product comprising:

a core sheet (1) made of an aluminum alloy;

an aluminum alloy clad layer (2) cladding on at least one of the surfaces of said core sheet; and a layer (3) comprising nickel on the outersurface of one or both said clad layer or layers (2);

wherein the brazing sheet product is devoid of a layer comprising zinc or tin as a bonding layer between said outersurface of said aluminum alloy clad layer or layers (2) and said layer comprising nickel (3), and the aluminum clad alloy layer comprises, in weight percent:

| | |
|---|---|
| Si | 2 to 18 |
| Mg | up to 8.0 |
| Zn | up to 5.0 |
| Cu | up to 5.0 |
| Mn | up to 0.30 |
| In | up to 0.30 |
| Fe | up to 0.80 |
| Sr | up to 0.20 | at least one element selected from the group consisting of:

| | |
|---|---|
| Bi | 0.01 to 1.0 |
| Pb | 0.01 to 1.0 |
| Li | 0.01 to 1.0, and |
| Sb | 0.01 to 1.0; and | impurities each up to 0.05, total up to 0.20
balance aluminum, wherein said core sheet (1) is coupled to said aluminum alloy clad layer (2) via at least one intermediate layer (4).

13. The brazing sheet product according to claim 1, wherein said core sheet (1) is an aluminum alloy comprising magnesium in an amount in the range of up to 8.0%.

14. An assembly of components comprising at least one brazing sheet product according to claim 1 joined by brazing to another component.

15. A method of manufacturing an assembly of brazed components, comprising the sequential process steps of:
   (a) forming said components of which at least one is made from brazing sheet product according to claim 1;
   (b) assembling the components into an assembly;
   (c) brazing the assembly under a vacuum or in an inert atmosphere in the absence of a brazing-flux at elevated temperature for a period long enough for melting and spreading of the clad layer;
   (d) cooling the brazed assembly.

16. A method of using an aluminum clad alloy in brazing sheet product according to claim 1 comprising brazing an assembly comprising said aluminum clad alloy.

17. A method of using an aluminum clad alloy according to claim 1 comprising brazing an assembly comprising said aluminum clad alloy in an inert atmosphere brazing process in the absence of a brazing-flux.

18. The method of claim 17, wherein the aluminum clad alloy comprises, in weight %,

| | |
|---|---|
| Si | 2 to 18, |
| Bi | 0.01 to 1.0, | elements other than aluminum, Si and Bi, each up to 0.05%, total up to 0.20%, balance aluminum.

19. The method of claim 17, wherein the aluminum clad alloy comprises, in weight %,

| | |
|---|---|
| Si | 2 to 18, |
| Mg | 0.5 to 8.0, |
| Bi | 0.01 to 1.0, | elements other than aluminum, Si, Mg and Bi, each up to 0.05%, total up to 0.20%,
balance aluminum.

20. The method of use according to claim 17, wherein the aluminum clad alloy comprises, in weight %,

| | |
|---|---|
| Si | 2 to 18, |
| Zn | up to 5.0, |
| Bi | 0.01 to 1.0, | elements other than aluminum, Si, Zn, and Bi, each up to 0.05%, total up to 0.20%,
balance aluminum.

21. The method of claim 17, wherein the aluminum clad alloy comprises, in weight %,

| | |
|---|---|
| Si | 2 to 18, |
| Bi | 0.01 to 0.5, | elements other than aluminum, Si and Bi, each up to 0.05%, total up to 0.20%,
balance aluminum.

22. The method of claim 17, wherein the aluminum clad alloy comprises, in weight %,

| | |
|---|---|
| Si | 2 to 18, |
| Mg | 0.5 to 2.5, |
| Bi | 0.01 to 0.5, | elements other than aluminum, Si, Mg, and Bi, each up to 0.05%, total up to 0.20%,
balance aluminum.

23. The method of claim 17, wherein the aluminum clad alloy comprises, in weight %,

| | |
|---|---|
| Si | 2 to 18, |
| Zn | 0.5 to 3.0, |
| Bi | 0.01 to 0.5, | elements other than aluminum, Si and Bi, each up to 0.05%, total up to 0.20%,
balance aluminum.

24. The method of claim 17, wherein the aluminum clad alloy comprises, in weight %,

| | |
|---|---|
| Si | 2 to 18, |
| Cu | up to 5.0, |
| Bi | 0.01 to 0.5 | elements other than aluminum, Si, Cu, and Bi, each up to 0.05%, total up to 0.20%,
balance aluminum.

25. The brazing sheet product according to claim 1, wherein the aluminum alloy clad layer (2) consists of, in weight percent:

| | |
|---|---|
| Si | 2 to 18 |
| Mg | up to 8.0 |
| Zn | up to 5.0 |
| Cu | up to 5.0 |
| Mn | up to 0.30 |
| In | up to 0.30 |
| Fe | up to 0.80 |
| Sr | up to 0.20 | at least one element selected from the group consisting of:

| | |
|---|---|
| Bi | 0.01 to 1.0 |
| Pb | 0.01 to 1.0 |
| Li | 0.01 to 1.0, and |
| Sb | 0.01 to 1.0; and | impurities each up to 0.05, total up to 0.20 balance aluminum.

26. The brazing sheet product according to claim 25, wherein said aluminum clad layer (2) contains by weight Mg in an amount in the range of 0.2 to 2.0%.

* * * * *